US005265510A

United States Patent [19]

Hoyer-Ellefsen

[11] Patent Number: 5,265,510

[45] Date of Patent: Nov. 30, 1993

[54] MATERIAL WORKING AND TOOL CONTROL SYSTEM

[76] Inventor: Sigurd Hoyer-Ellefsen, 540 Kay Terr., Boca Raton, Fla. 33432

[21] Appl. No.: 819,218

[22] Filed: Jan. 13, 1992

[51] Int. Cl.[5] .............................................. B23D 45/04

[52] U.S. Cl. .................................. 83/471.3; 83/468.3; 83/486.1; 83/477

[58] Field of Search .................... 83/490, 471.3, 468.1, 83/477.2, 491, 468.2, 468.3, 486.1, 581, 477, 477.1, 472, 473, 485

[56] References Cited

U.S. PATENT DOCUMENTS 2,007,563 7/1935 DeKoning ......................... 83/486.1
2,320,743 6/1943 Nilsen ................................ 83/486.1
3,026,917 3/1962 Schwartz ............................. 83/490
3,998,121 12/1976 Bennett ............................. 83/471.3
4,660,448 4/1987 Bies ...................................... 30/376

*Primary Examiner*—Hien H. Phan
*Assistant Examiner*—Allan M. Schrock
*Attorney, Agent, or Firm*—Melvin K. Silverman

[57] ABSTRACT

A material-working and tool control system for use with a workbench includes a system platform in rotatable, co-planar communication with the workbench. Further included is a tool-carrying platform. Also provided are first and second protractor assemblies, each having first and second legs which are adjustably hinged to each other. An opposite end of the first leg is in pivotal communication with the workbench surface through an axis-of-rotation normal to the workbench, and an opposite end of the second leg of the first protractor assembly is in pivotal communication with the tool-carrying platform through an axis-of-rotation also normal to the workbench. A plane is defined by the hinged relationship between the legs of the first protractor assembly which plane is normal to a plane defined by the hinged relationship between the legs of the second protractor assembly. An opposite end of the first leg of the second protractor assembly is in rotational communication with a surface of the rotatable platform through an axis-of-rotation co-parallel to the workbench surface, and the opposite end of the second leg of the second protractor assembly is in rotational communication with the tool-carrying platform through an axis rotation co-parallel with the workbench surface. Resultingly, the position of the tool-carrying platform is defined by the intersection of elliptical segments of rotation (within said normal planes) formed by the opposite ends of the second legs of each of the first and second protractor assemblies.

6 Claims, 5 Drawing Sheets

MATERIAL WORKING AND TOOL CONTROL SYSTEM

BACKGROUND OF THE INVENTION

The adjustability of saws and other electric machine tools relative to the surface of a workbench has been a long-standing concern in the prior art.

More particularly, in applications such as the construction of roof trusses, where numerous members having a variety of different cuts and angles therein must be generated in large numbers, factors such as the mobility, portability, ease of adjustability and re-positioning of the tool, and weight of the system, are all important factors.

While numerical control machines have become commonplace in many machine tool areas, for example, machine drills, lathes, files, etching devices, and many other areas, a suitable numerical (or computer) control machine suitable for use with a power saw at a construction site in which the cutting of many wood members, having various angles, as in a roof truss structure, has not appeared in any practical or economic form.

Those efforts along these lines, known to the inventor, include a programmable turntable manufactured by Speed Cut, Inc., of Corvallis, Oreg. 97339, and the so-called SPIDA Radial Saw, also manufactured by Speed Cut. Comparable products are offered by a handful of other companies around the world.

Systems such as those of Speed Cut, Inc. involve considerable weight, occupy a large volume and ground area, are heavy, costly, are not easy to adjust or program, and are time-consuming to maintain. Also, they are not as easy or convenient to work with in the field as might be desired.

At a more technical level, systems such as those of Speed Cut make use of articulated arms which extend directly from a rotatable workbench associated with the cutting system. The shortcoming of this structure is that vertical loads upon the arms are transmitted to a rotatable workbench. Therefore a particularly robust structure is required, with the costs attendant thereto. Also, achievement of proper registration between the cutting tool and the cutting tool is complex where the workpiece is secured to a rotatable workbench. That is, loads on vertical bearings are not evenly distributed, this degrading accuracy of the saw blade. Understandably, systems of the above type also impart considerable wear on their moving parts.

It is, therefore, as a response to the above set forth long-felt need in the prior art that the invention is directed.

SUMMARY OF THE INVENTION

The instant invention relates to a material-working system for use with a workbench having a planar surface. The inventive system includes a platform in rotatable, co-planar communication with said surface of the workbench, through an axis-of-rotation normal to the workbench, and positioned either above or below said surface. Further included is a tool-carrying platform. There is also provided first and second protractor means, each having first and second legs which are hinged to each other. The angle of the hinge is adjustable by manual or mechanized means. An opposite end of said first leg of first protractor means is in pivotal communication with the workbench surface through an axis-of-rotation normal to the workbench, and the an opposite end of the second leg of the first protractor means is in pivotal communication with the tool-carrying platform through an axis-of-rotation normal to said workbench.

A plane is defined by said hinged relationship between the legs of said first protractor means which is normal to a plane defined by the hinged relationship between the legs of said second protractor means. An opposite end of the first leg of said second protractor means is in pivotal communication with a surface of said rotatable platform through an axis-of-rotation co-parallel to the workbench surface, and the an opposite end of the second leg of the second protractor in pivotal communication with the tool-carrying platform through an axis rotation co-parallel with the workbench surface. Resulting, the position of the tool-carrying platform is defined by the intersection of elliptical segments of rotation (within said normal planes) formed by the pivoted ends of the second legs of each of the first and second protractor means.

The above and yet other objects and advantages of the invention will become apparent from the hereinafter set forth Brief Description of the Drawings, Detailed Description of the Invention, and Claims appended herewith.

DETAILED DESCRIPTION OF THE INVENTION

Figure 2:
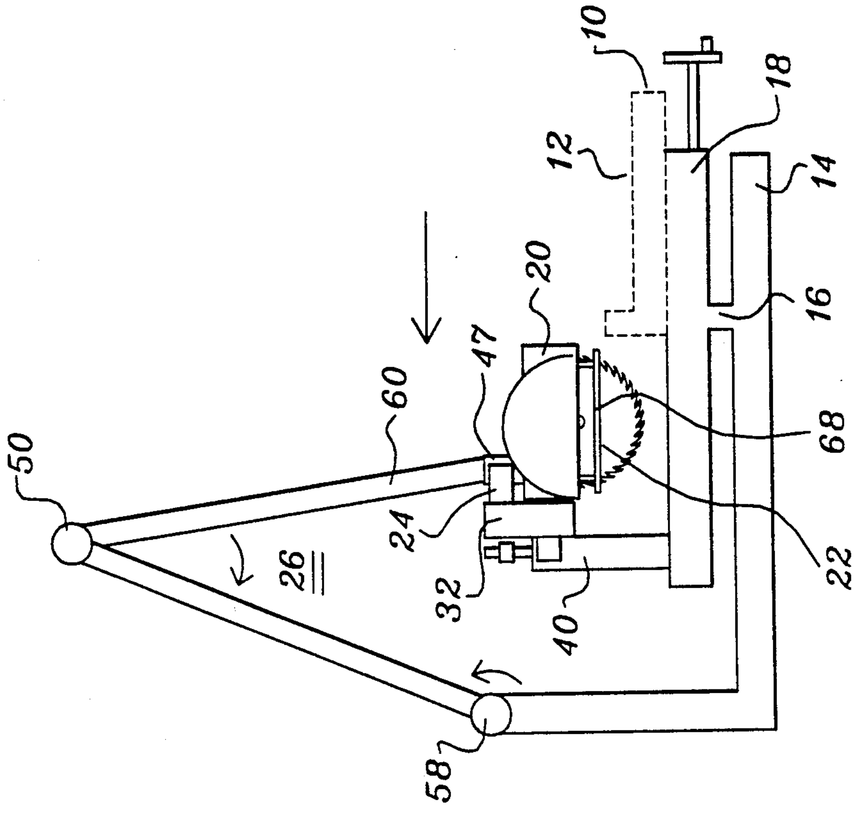
FIG. 2 is a side left elevational view thereof.
Figure 1:
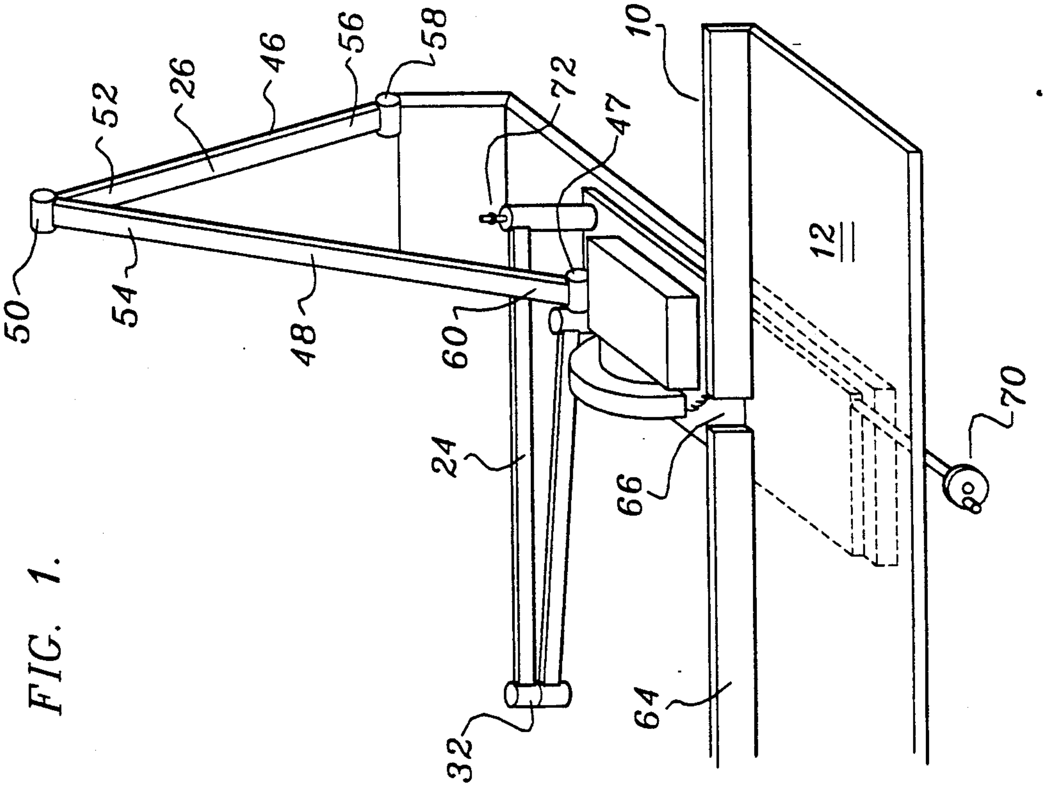
FIG. 1 is a perspective view of the inventive system.

With reference to the perspective view of FIGS. 1 and 2, there is shown, in phantom, a workbench 10 including a surface 12. Said workbench it is to be understood, represents a generic workbench which, in a given application, will include such elements as clamps, stops, miter boxes and other angle control means, the use of which may or may not be required, depending upon a given application of the instant system.

With particular reference to the inventive system there is, shown at a level beneath workbench 10, a platform 14 which is in rotatable communication with said workbench through an axis-of-rotation 16 which is normal to both said workbench surface 12 and to a base platform 18 which is in rigid communication with said workbench 10. It is noted that said base platform 18 is an optional element which will be generally useful where the inventive system is used to retrofit a pre-existing workbench. In other words, where a workbench is manufactured particularly for use with the instant system, the use of base platform 18 will generally be unnecessary or will constitute an option.

Also, axis-of-rotation 16 may or may not pass through said base platform 18 in embodiments where platform 18 is employed. However, in all embodiments, axis-of-rotation 16 must be in orthogonal (normal) relationship to workbench 10 and its surface 12.

It is also noted that base platform 18, where employed, may be positioned either above or below workbench 10. Similarly, in a given embodiment, rotatable platform 14 may also be positioned slightly below workbench surface 12 or, in other embodiments, may be positioned above the other mechanical elements system described below.

With reference to FIGS. 1 thru 4, the instant inventive system is seen to further include a tool-carrying platform 20 to which may be attached either an electric circular saw 22, shown in the figures, or any of a variety of other tools such as tools for engraving, milling, grinding, polishing and painting.

Further provided, as integral elements in the instant invention, are first protractor means 24 and second protractor means 26.

First protractor means 24 includes a first leg 28 and a second leg 30, which legs are connected in rotational co-planar relationship by a hinge 32 such that hinged end 34 of first leg 28 and hinged end 36 of second leg 30 may rotate relative to each other. However, an opposite end 38 of first leg 28 is maintained in pivotal communication with workbench 10 through an axis-of-rotation 40 (see FIGS. 2 thru 4) which is normal to the workbench surface. Accordingly, hinged end 34 of first leg 28 is capable only of uni-planar rotational movement relative to axis-of-rotation 40.

Figure 4:
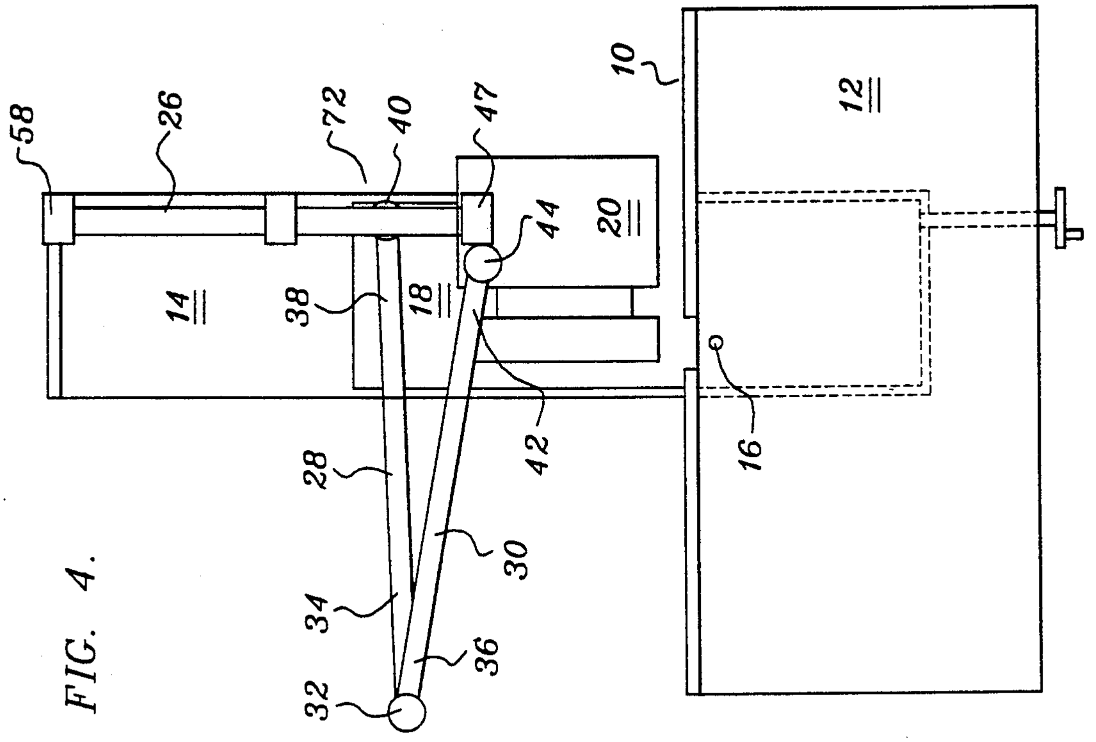
FIG. 4 is a top view of FIG. 1.

An opposite end 42 of second leg 30 is maintained in the pivotal communication with said tool-carrying platform 20 through an axis-of-rotation 44 (see FIG. 4). However, in that platform 20 is not fixed to any other element, other than axis-of-rotation 47 (explained below), platform 20 and with it, pivoted end 42 of second leg 30 is free to rotate about hinge 32 and, as well, to rotate about axis-of-rotation 40. Accordingly, the composite vector describing the motion of end 42 of second leg 30 will be that of the combination of two arcs of rotation, i.e., the vectorial sum of a first circle of rotation corresponding the rotation of end 42 about hinge 32 and of a second arc of rotation corresponding to rotation of end 42 about axis-of-rotation 40. This resultant movement will be that of a curved line resembling an arc of an ellipse, this vector sum hereinafter referred to as an elliptical arc of rotation.

It is noted that all movement of first protractor means 24 and its above described constituent elements will occur in a fixed plane in that axes of rotation 40 and 44 are both normal to workbench 10 and, thereby, co-parallel to each other. Resultantly, all degrees of freedom of the elements of first protractor means 24 are within the same plane. Stated otherwise, the above referenced elliptical arc of rotation will be within that plane defined by the lines of said first and second legs 28 and 30 respectively.

Figure 3:
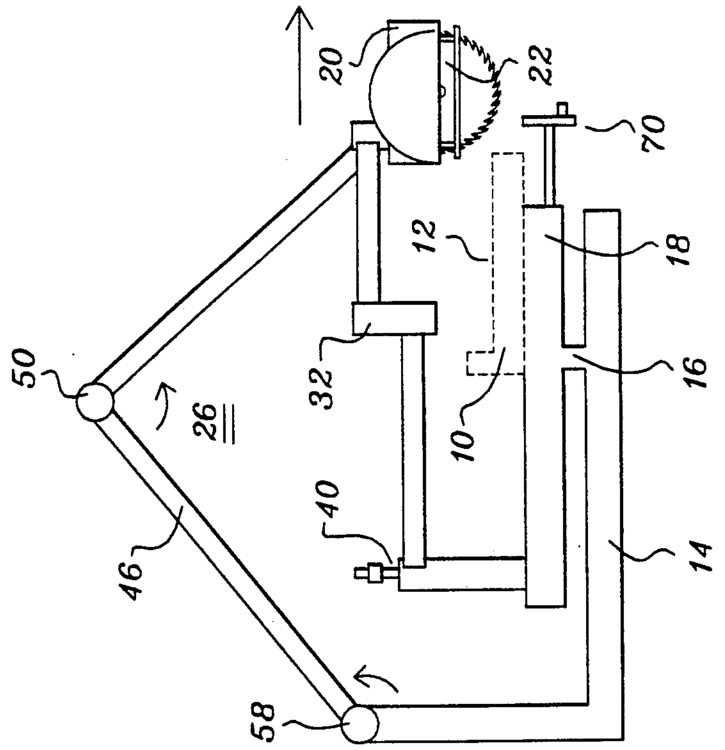
FIG. 3 is a view, similar to FIG. to FIG. 2, further showing the system from the left side thereof.

With regard to second protractor means 26, it is noted, with reference to FIGS. 2 and 3, that said means 26 includes a first leg 46 and a second leg 48 which are joined at hinge 50, at hinged ends 52 and 54 thereof respectively. In other words, hinged end 52 of first leg 46 is hinged to first end 54 of second leg 48 at hinge 50.

It is further noted, with reference to FIGS. 2 and 3, that said first leg 46 includes a an opposite end 56 which is pivotally connected through axis-of-rotation 58 to rotatable platform 14, said axis-of-rotation 58 being co-parallel to surface 12 of workbench 10. Correspondingly, opposite end 60 of second leg 48 is maintained in pivotal relationship to tool-carrying platform 20 through axis-of-rotation 47. Accordingly, in similar fashion to said first projector means, said second projector means includes two legs having opposing hinged ends thereof and, at opposite ends of each leg is coupled to other elements of the system through an axis-of-rotation. However, unlike said first protractor means, said axes of rotation 47 and 58 of said second protractor means are coupled to other elements of the system through axes that are co-parallel, as opposed to normal, to the workbench. Accordingly, all elements of said second protractor means 26 will operate in a plane which is orthogonal to the above referenced plane within which the elements of said first protractor means may move, and which is rotatable by said rotatable platform 14.

It is noted that axis-of-rotation 47 of second protractor means is preferably located as close as possible to said axis-of-rotation 44 of said first protractor means in order to minimize introduction of error of possibly error and induction of torques into the system.

Resultant from the above structure, it may be seen that tool carrying platform 20 is moveable in the plane of the first protractor means and intersects a three dimensional vector which is defined by the combination of elliptical arcs along which respective ends 42 and 60 are permitted to follow. That is, end 60 of second protractor means will follow a vector determined by the sum of two circular arcs, namely, the rotation of end 60 about hinge 50 and of end 60 about axis-of-rotation 58, the sum being a segment of an ellipse above discussed. Accordingly, the location in three dimensional space of tool-carrying platform 20 will be the sum, of said two elliptical arcs travelling in planes that, are at right angles to each other, in which the plane of first protractor means is fixed to base platform 18 and second protractor means is rotatable by said platform 14.

With reference to FIGS. 1 to 8 it is noted that workbench 10 is provided with guide means 64 against which the workbench is placed. Within guide means 64 is a slot 66 thru which blade 68 of saw 22 may pass. Said slot 66 will be preferably positioned over axis 16, described above.

Further shown in FIGS. 1 to 4 are control means 70 and 72 by which the vertical position of the protractor means 26 may be adjusted. Other control means, directly coupled to hinges 32 and 50 or their associated arms, may be employed.

Figure 6:
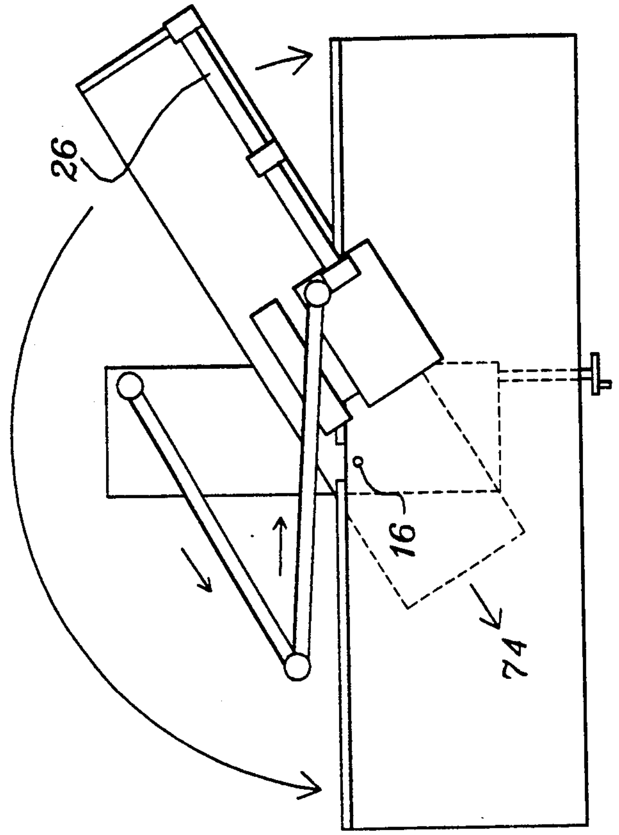
FIG. 6 is a second operational top view of FIG. 4.
Figure 5:
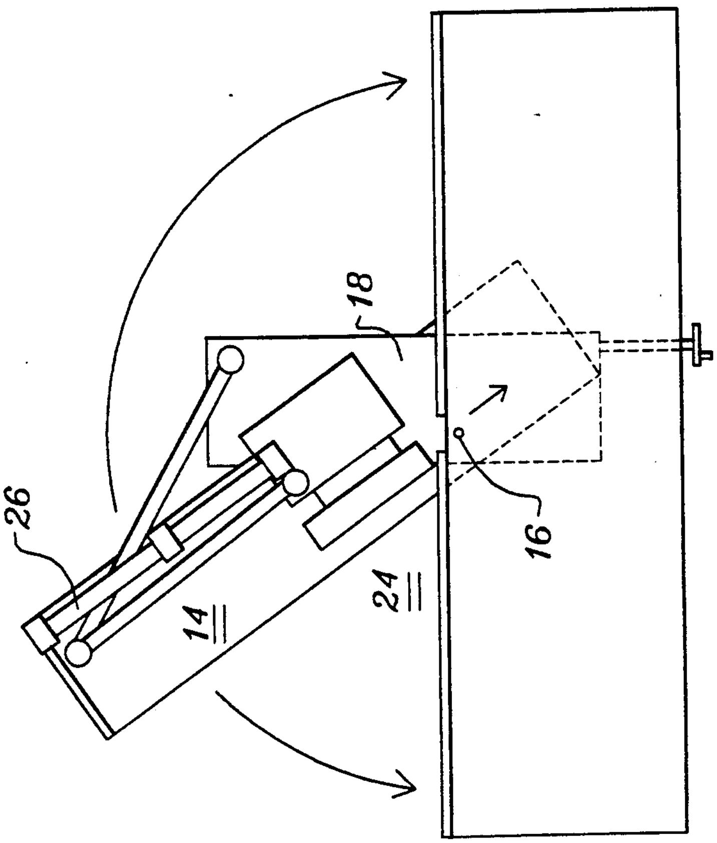
FIG. 5 is a first operational top view of FIG. 4.
Figure 8:
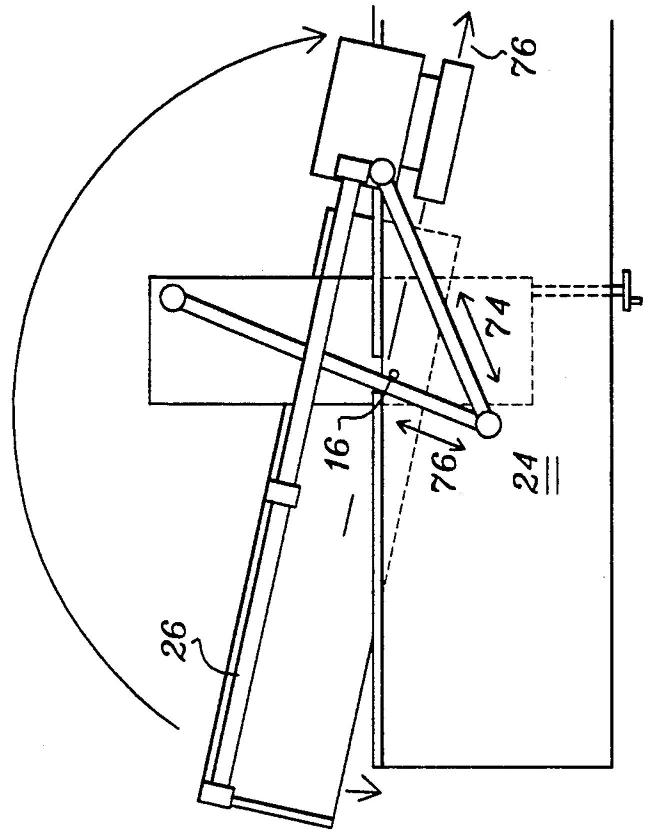
FIG. 8 is a fourth operational side view of FIG. 4.
Figure 7:
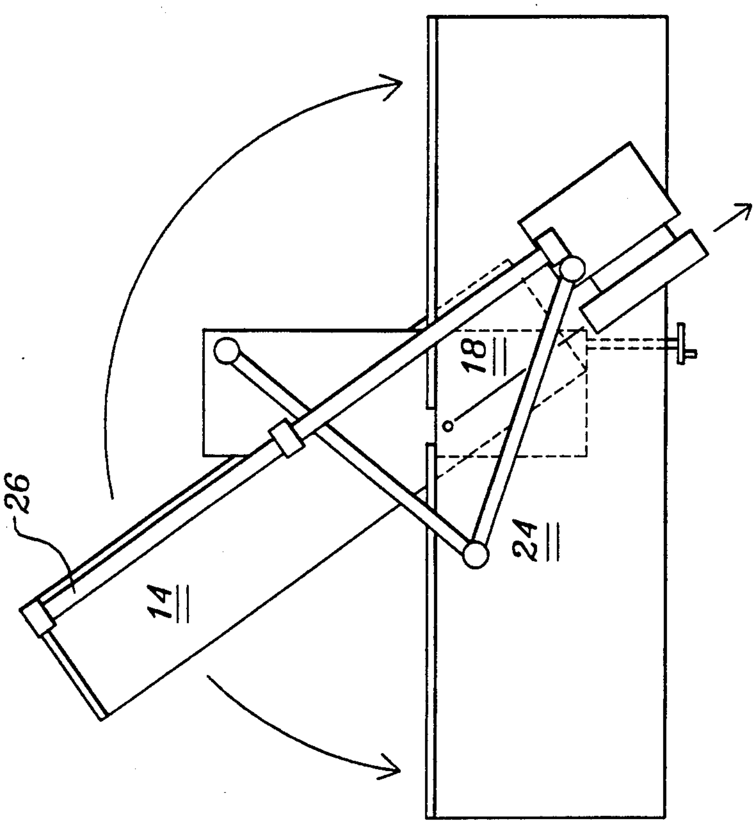
FIG. 7 is a third operational side view of FIG. 4.

With reference to FIGS. 6 and 8, the path of vertical loading is indicated by arrows 74 and 76. Thereby vertical loading is diverted from rotatable platform 14, thusly solving one of the problems in prior art devices of this type. Horizontal loads in the instant system are negligible.

Figure 9:
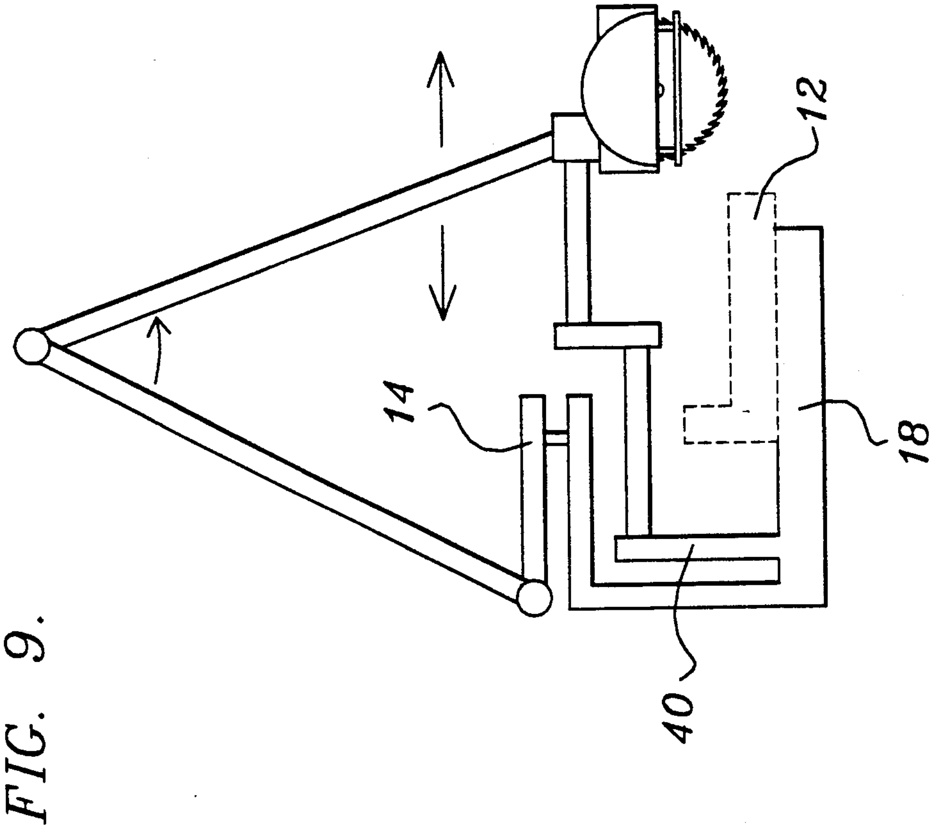
FIG. 9 is a side view of a further embodiment of the invention.

Shown in FIG. 9 is a further embodiment of the invention in which the rotatable platform is positioned above the workbench.

Accordingly, while there has been shown and described the preferred embodiment of the present invention, it is to be appreciated that the invention may be embodied otherwise than is herein specifically shown and described and that, within such embodiment, certain changes may be made within the form and arrangements of the parts without departing from the underlying idea or principles of this invention within the scope of the Claims appended herewith.

Having thus described my invention what I claim as new, useful and non-obvious and, accordingly, secure by Letters Patent of the United States is:

1. A material-working and tool control system including a workbench having a substantially planar surface, the system comprising:

(a) a system platform in rotatable communication with said surface of said workbench through a fixed first axis-of-rotation normal to said surface;

(b) a tool-carrying platform;

(c) a first protractor means having first and second co-planar legs, each leg thereof having an hinged end and an opposite end, said hinged ends having a hinge therebetween in which an included angle of said protractor means, within a first plane, is adjustable through said hinge between said first and second legs thereof, said opposite end of said first leg in pivotal communication with said workbench through a second axis-of-rotation normal to and fixed relative to said workbench surface, and said opposite end of said second leg in rotational communication with said tool-carrying platform through a third axis-of-rotation normal to said workbench surface; and (d) second protractor means having first and second co-planar legs, each leg thereof having an hinged end and an opposite end, said hinged ends having a hinge therebetween in which an included angle of said second protractor means, within a plane normal to said plane of said first protractor means, is adjustable through said hinge between said first and second legs, said opposite end of said first leg in pivotal communication with said rotatable system platform through a fourth axis-of-rotation co-parallel to said workbench surface and said opposite end of said second leg in rotational communication with said tool-carrying platform through a fifth axis-of-rotation co-parallel to said workbench surface, whereby a path of motion of said tool-carrying platform is defined by said first and second protractor means and the hinges associated therewith.

2. The system as recited in claim 1 in which said tool-carrying platform includes a circular power saw.

3. The system as recited in claim 1 further comprising a position adjustable material-working stop or guide upon said workbench, said stop or guide including a slot through which a cutting element of a tool positioned upon said tool-carrying platform may pass.

4. The system as recited in claim 3 in which said slot of said stop or guide is positioned such that said first axis-of-rotation posses substantially through said slot.

5. The system as recited in claim 1, wherein said workbench further comprises:

a base platform in which said first leg of said first protractor means is, at said opposite end thereof, in rotational communication with said base platform through said second axis-of-rotation normal to said workbench surface.

6. The system as recited in claim 5 in which said first axis-of-rotation of said rotatable platform passes through said base platform.

* * * * *